United States Patent [19]

Sugita et al.

[11] Patent Number: 4,796,223

[45] Date of Patent: Jan. 3, 1989

[54] MICRO-COMPUTER CONTROL FOR A VIDEO MACHINE

[75] Inventors: Takatoshi Sugita, Sagamihara; Shunsuke Furukawa, Tokyo, both of Japan

[73] Assignee: Sony Corporation, Tokyo, Japan

[21] Appl. No.: 920,940

[22] Filed: Oct. 20, 1986

Related U.S. Application Data

[63] Continuation of Ser. No. 380,131, May 20, 1982, abandoned.

[30] Foreign Application Priority Data

May 28, 1981 [JP] Japan .................................. 56-81516

[51] Int. Cl.$^4$ .............................................. G06F 3/06
[52] U.S. Cl. .................................................. 364/900
[58] Field of Search ..................... 371/68, 69; 360/47, 360/13, 14.2, 27, 30–33; 364/200 MS File, 900 MS File; 369/32

[56] References Cited

U.S. PATENT DOCUMENTS

| | | | |
|---|---|---|---|
| 3,303,482 | 2/1967 | Jenkins | 360/47 |
| 4,142,232 | 2/1979 | Harvey | 364/200 |
| 4,210,785 | 7/1980 | Huber et al. | 369/32 |
| 4,375,101 | 2/1983 | Cerracchio | 371/69 |
| 4,422,105 | 12/1983 | Rodesch et al. | 360/72.1 |
| 4,476,499 | 10/1984 | Kanamaru et al. | 360/27 X |

*Primary Examiner*—Thomas M. Heckler
*Attorney, Agent, or Firm*—Hill, Van Santen, Steadman & Simpson

[57] ABSTRACT

An interface circuit is provided for combining a personal computer system with a home type video tape recorder (VTR).

The proposed interface circuit enables the VTR to store a computer program just like an auxiliary memory, and the VTR can be operated based on the program stored on a portion of a video tape. A preferred application is to use the VTR as an interactive educational machine.

9 Claims, 15 Drawing Sheets

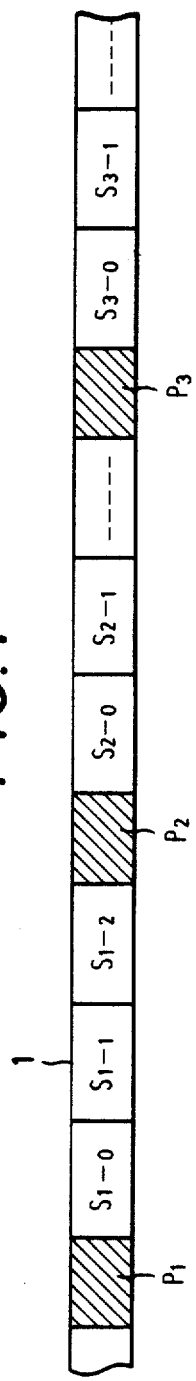
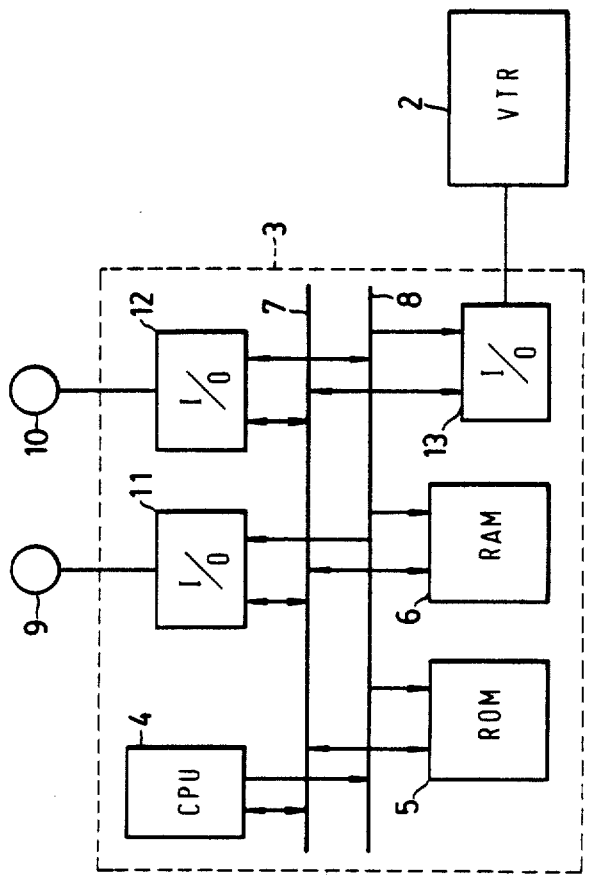
FIG. 1
FIG. 2

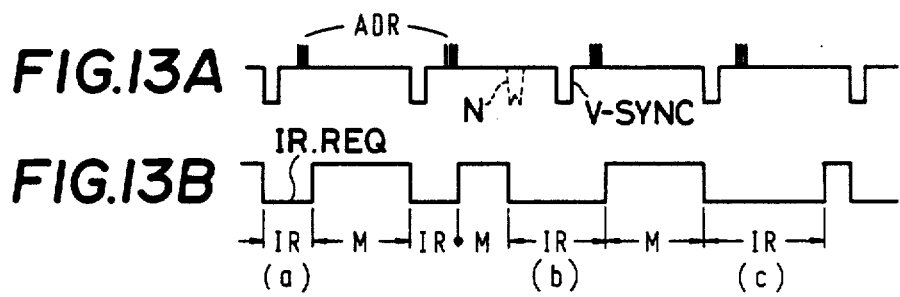
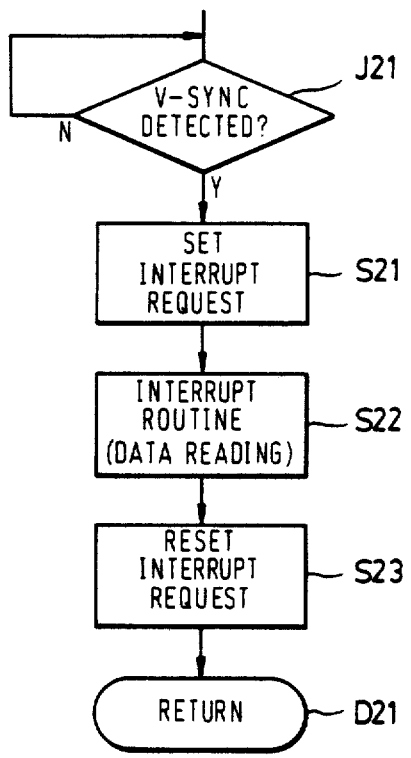

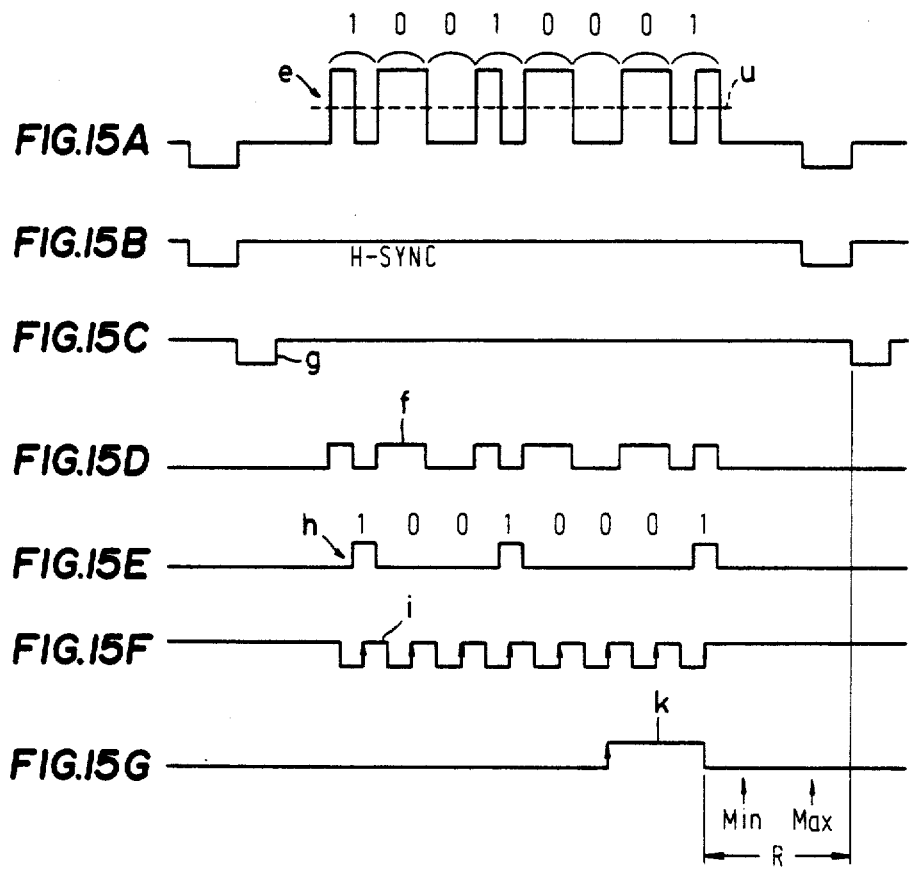

MICRO-COMPUTER CONTROL FOR A VIDEO MACHINE

This is a continuation of application Ser. No. 380,131 filed May 20, 1982, now abandoned.

BACKGROUND OF THE INVENTION

1. Field of the Invention

The present invention relates generally to a control system for a video machine such as a video tape recorder which uses a computer such as a micro-computer.

2. Description of the Prior Art

Education systems utilizing VTRs have been used for education in schools or the like. In such education systems, a VTR is, in general, manually operated to reproduce video information according to the educational schedule. The manual operation places a big load on the teacher.

SUMMARY OF THE INVENTION

It is an object of the present invention to provide a video player control system which couples a computer such as a micro-computer to a video player such as a VTR and which allows the automatic playback of video data according to the educational schedule of a school and requires a minimum quantity of hardware.

The above, and other objects, features and advantages of the invention, will be apparent in the following detailed description of illustrative embodiments of the invention which is to be read in connection with the accompanying drawings wherein the same reference numerals are used to identify the same parts in the several views.

BRIEF DESCRIPTION OF THE DRAWINGS

FIG. 1 is a plan view showing data recorded on a video tape which is used in a video player control system according to the present invention;

FIG. 2 is a block diagram of the overall video player control system;

FIGS. 13A and 13B show timing charts for explanation of the program interrupt operation for data reading in the circuitry shown in FIG. 12;

FIG. 14 is a flowchart for explanation of the program interrupt operation;

FIGS. 15A-15G show timing charts for explanation of the data reading operation in the circuitry shown in FIG. 12;

DETAILED DESCRIPTION OF THE PREFERRED EMBODIMENTS

Figure 3:
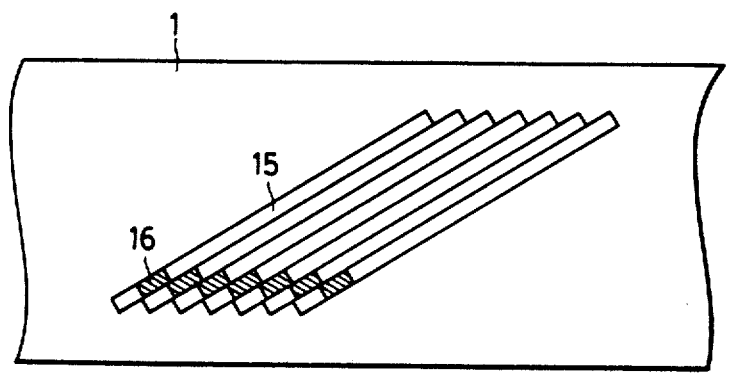
FIG. 3 is a plan view showing the track pattern on the video tape.

The preferred embodiment of the present invention will now be described with reference to the accompanying drawings.

In a video player control system according to the preferred embodiment of the present invention, program data for a CPU of a micro-computer system is recorded on video tracks of a video tape. Also, video signals are recorded. During playback, the playback mode or status of the video signals recorded on the video tape is controlled in accordance with the program data reproduced from the video tape. On each track of the video tape there is recorded address data for the purpose of searching the video source or computer programs recorded on the video tape.

A video player control system of the type described above may, for example, be adopted and used in an educational system such as a driving school.

FIG. 1 is a plan view showing data recorded on a video tape 1 used in the video player control system. On the video tape 1 there are recorded video sources $S_1$, $S_2$, $S_3$, . . . which are grouped according to the teaching levels of the students. Adjacent to these video sources are recorded computer programs $P_1$, $P_2$, $P_3$, . . . for the system control. These programs are loaded into the micro-computer, and then the micro-computer operates according to the loaded programs, so that the overall system is controlled. Each program includes a program for sending questionnaires to the students, and a program for searching and reproducing the required data according to the response (key operation) of the student to the questionnaire. In addition, the first program $P_1$ preferably contains the data of the addresses of other programs $P_2$, $P_3$, . . . on the tape. When the first program $P_1$ is loaded into the micro-computer, the address data are stored in the micro-computer. Based on the address data, the required tape position is searched for other programs $P_2$ and $P_3$.

FIG. 2 is a block diagram of the overall video player control system. A VTR 2 is coupled to a micro-computer 3. The program recorded on the tape of the VTR 2 is loaded into the micro-computer 3. Based on this program, the micro-computer 3 controls the operation of the VTR 2.

As is well known, the micro-computer 3 has a CPU 4 (central processing unit); a ROM 5; a RAM 6; and an address bus 7 and a data bus 8 which couple these units together. I/O interface circuits 11 and 12 couple the micro-computer 3, and a keyboard 9 and a printer 10 which are externally provided as peripherals of the micro-computer system. The VTR 2 is also coupled to the CPU 4, the ROM 5, and the RAM 6 of the microcomputer 3 through an I/O interface circuit 13 included on the auxiliary board. The VTR 2 may comprise a commercially available VTR without any modifications.

FIG. 3 is a plan view showing the track pattern on the video tape 1. Addresses 16 representing the absolute addresses of tracks 15 are written in the respective vertical blanking intervals of the respective tracks 15 on the video tape 1. The programs and control data are written in the video signal areas together with sync signals. The video source and the program may be recorded in separate areas within a single track. In this case, the upper or lower ½ of the monitor screen may be used for projecting the video source.

Figure 4:
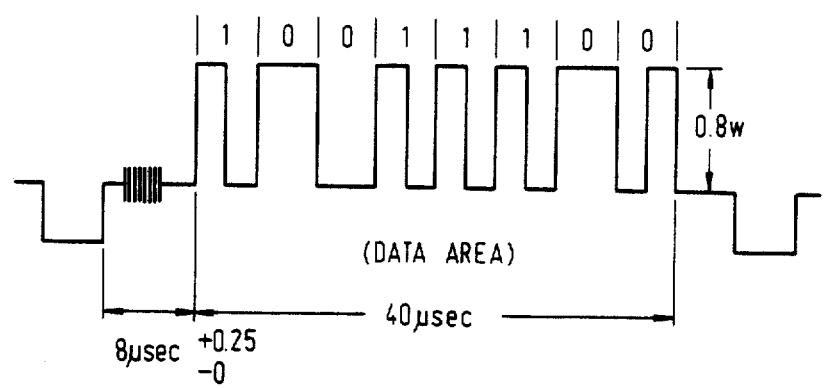
FIG. 4 shows the waveform of the format of the digital signal such as address and program data recorded on the video tape.

FIG. 4 shows the waveform of the format of the digital signal such as address or program data recorded on the vdieo tape. In this embodiment, the number of bits recorded in one horizontal scan interval is 8 bits which is the same as the number of bits which may be handled by the CPU 4 of the micro-computer 3. According to this format, the data load process including the data readout, the error check, and the data storage may be performed by processing with software. Thus, the I/O interface circuit 13 between the VTR 2 and the CPU 4 will be of simple configuration. Furthermore, loading of data may be performed in real time and without time delay. Since the maximum frequency of the recorded data is several hundred kHz, the recorded data is less susceptible to the adverse effects of jitter. It is possible, of course, to record 8-bit data in one horizontal scan interval using a CPU capable of processing 16-bit data at one time.

The data is recorded by FM modulation in a horizintal scan interval of 40 μsec as shown in FIG. 4. Data "1" of the FM modulated data has a leading or trailing edge within one bit, and the data "0" does not have this transition. If the data is converted into transmission signals with self-clocks, signals of high level are always present even with all-zero data. Therefore, it is possible to distinguish the horizontal scan interval including data from the horizontal scan interval including no data.

A method is known for generating clocks for data reading by using the sync signal in the video signal. In general, when the VTR is placed in the high speed search mode (high speed playback), a reproduced vertical sync signal is not available. Therefore, a re-generated or quasi vertical sync signal is added to the reproduced video signal. In this case, the data reading clock prepared based on the re-generated vertical sync signal is not synchronized with the data being reproduced so that reading of the data may not be perfectly performed. On the other hand, in the self-clock system of the embodiment of the present invention, data may be read out even during the high speed search mode. It is very important to search a particular tape position.

The data is recorded at 80% of the white peak (0.8 w) as shown in FIG. 4. In this manner, data may be recorded or reproduced without being adversely affected by an AGC circuit incorporated in the playback circuit in the VTR.

Figure 5:
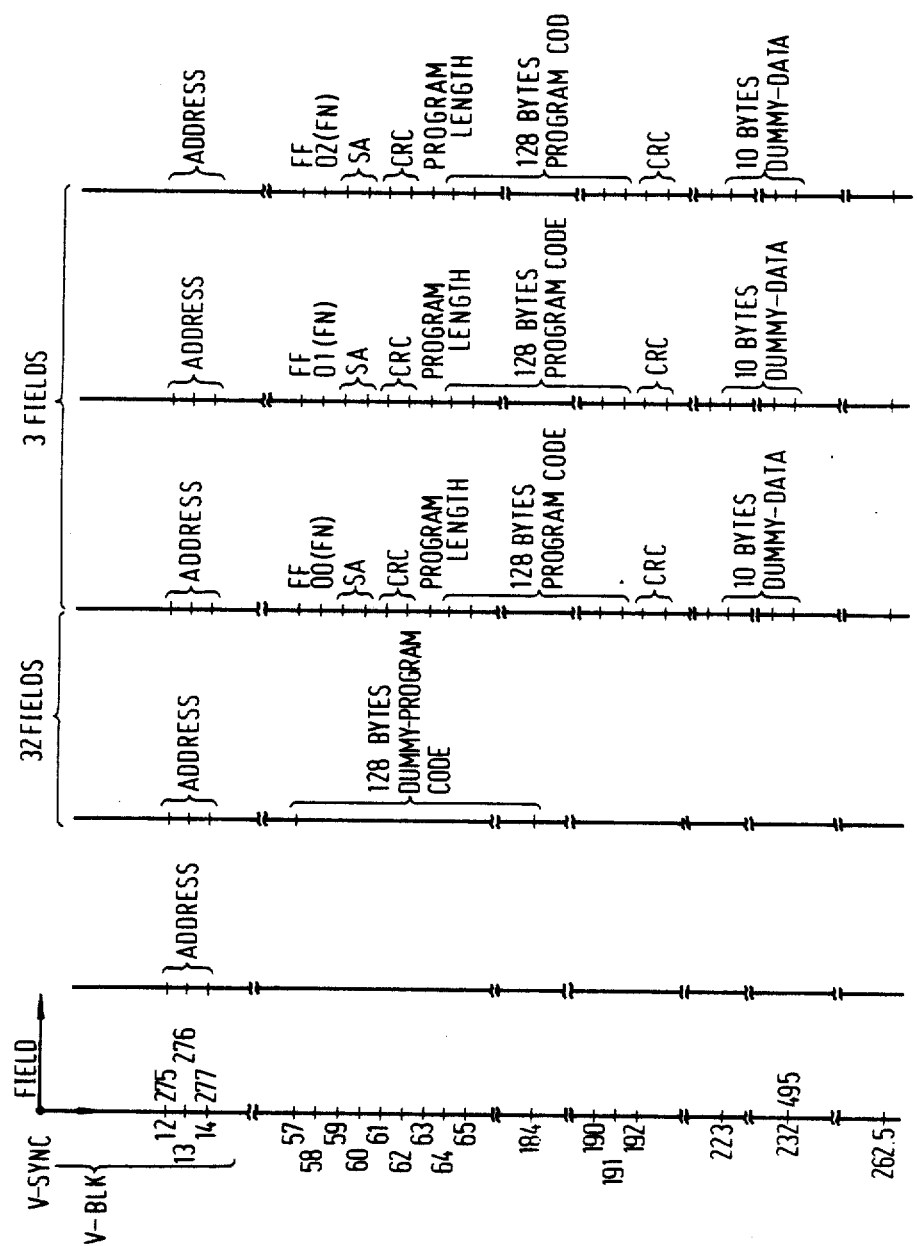
FIG. 5 is a diagram showing the write format of the data for each field.

FIG. 5 is a view showing the format of the data for each field. The vertical lines in FIG. 5 represent fields defining rasters for TV frames. Graduations on each vertical line indicate horizontal scanning line numbers. The address data is written in the 12th to the 14th horizontal scan intervals (H) of the vertical blanking interval (V-BLK). Therefore, since the address data is inserted in the non-signal interval immediately after the vertical sync signal, the reproduced image is not adversely affected. Each address is a 3-byte data (8 bits×3); the initial two bits are sync bits and the third bit is a parity check bit of the address data. Therefore, the actual address data itself consists of 21 bits, which allows addressing for tracks corresponding to video tapes of about 10 hours length.

The syncbits of each address are used to designate the kind of information of the track; "00" indicates the normal video signal, and "11" indicates the program data. Other codes "01" and "10" are used for writing special information for future applications. According to the format described above, when the code "11" changes to "00", it is confirmed that scanning of a field in which a program is written has ended. The parity bit which is inserted at the third bit of the address data is used as check data for address detection during the high speed picture search.

In the intervals on the video tape 1 recording programs $P_1, P_2, \ldots$ shown in FIG. 1, the program data is written after an interval corresponding to about 32 fields from the video sources $S_1, S_2, \ldots$, as shown in FIG. 5. In other words, when the recording content changes from video signals to program data, the recording signals are switched off during 32 fields before writing the program data. By incorporating such an interval, the unstable recording operation of the VTR 2 during switching from the video signal recording mode to the program data write mode is prevented, and the writing of the program data is facilitated. In this interval of 32 fields, a 128-byte dummy program code is written in the 57th line to the 184th line, respectively, of each field. By recording the dummy program, the recording circuit of the VTR 2 is placed in a condition such that it may record the actual program data in a stable manner.

In the field in which the program code is written, the sync pattern FF (FF in hexadecimal notation) is written in the 57th line. Since this sync pattern is FM modulated during the writing operation, as has been described above, it is recorded as a rectangular wave signal having 8 periods at a frequency of about 200 kHz. By the incorporation of such a sync pattern, even if the video signals and the program codes are coexistenting a single field and share a picture area, they may be differentiated from each other.

The program code is written in a plurality of tracks, each track having recording data of 128 bytes. If there is a readout error in one track, the overall program is rendered ineffective. Therefore, the same program data is written on three consecutive tracks. In order to differentiate between these, identification codes "00", "01", and "02" for identification of the three tracks are written in the 58th line next to the sync patterns.

Store address data SA for designating the start address of the RAM is written in the 59th and 60th lines following the identification code, so that the program may be stored in the RAM 6 of the micro-computer 3. A CRC code for error check of the store address data is written in the 61st and 62nd lines.

Data representing the length of the programs which are written in one track is written next to the CRC codes. Thereafter, the program codes of 128 bytes are written in the 64th to 191st lines. These program codes constitute part of the overall program (e.g., 1 k bytes). A CRC code (192nd and 193rd lines) is then written next to the program codes, completing a series of recording operations of the program data.

If data of 1 byte is lost by reading error during readout of data, the micro-computer 3 waits for the second byte (final data) of the CRC code corresponding to the lost data, so as to complete the readout routine (interrupt routine for readout operation of the computer). In order to complete the readout routine, 10-bit dummy data is written in the 223rd to 232nd lines at the terminal end of each track.

Figure 6:
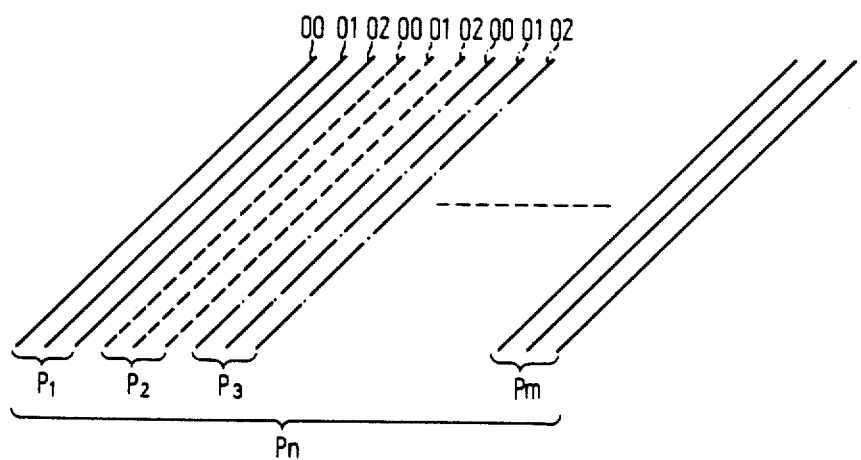
FIG. 6 is a diagram showing the respective tracks of the program write area of the video tape.

FIG. 6 is a view showing tracks in the program write area of the video tape. As has been described above, the same 128-byte program is written on each of three consecutive tracks 00, 01 and 02 to define one program segment $P_1$. A group of a plurality of program segments define one program block $P_n$. One program has a length correspondign to 256 bytes to 1 Kbytes, for example. If the program has a length of 256 bytes, the program is divided into segments of 128 bytes each. Each segment is written in three consecutive tracks; and one program is thus written in 6 tracks. If the program has a length of 1 Kbyte, it is written in 24 tracks.

In order to read out the program data, the first track (identification code "00") of the program segment is read out first. If there is no reading error, the same program written in the second and third tracks is not read out. If there is a reading error in the readout operation of the first track, the program recorded on the second track (identification code "01") is read out. If there is a reading error in the readout operation of the program recorded in the second track, the program recorded in the third track (identification code "02") is read out.

If there are readout errors up to the third track in one program segment, part of the program is lost and the overall program becomes ineffective. In order to prevent this, as shown in the plan view of FIG. 7, program blocks $P_n'$ and $P_n''$, which are the same as the program block $P_n$, are written in the adjacent areas. If a reading error of the program segment occurs in one program block $P_n$, the video tape is then rewound and the program block $P_n'$ is next read out. If a readout error occurs in the readout operation of the program block $P_n'$, the video tape is rewound again, and the last program block $P_n''$ is read out.

Figure 8:
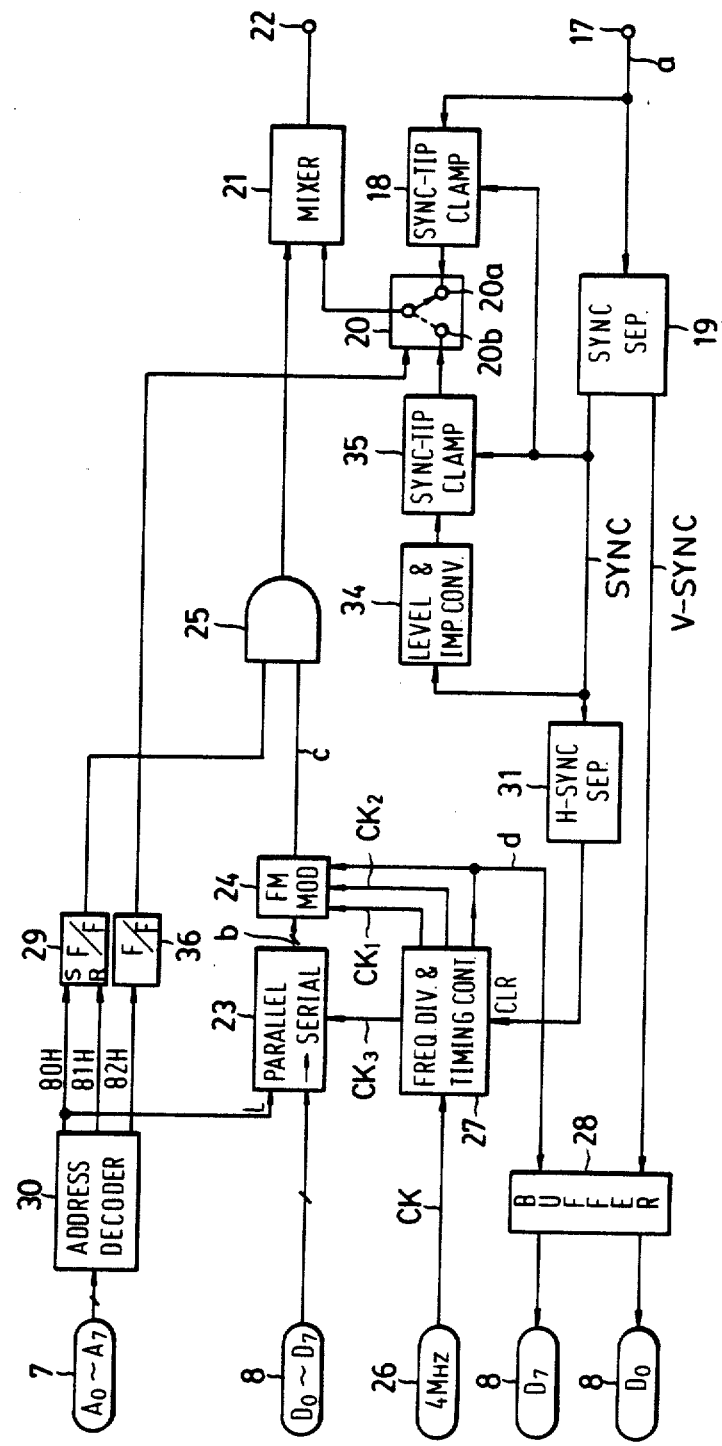
FIG. 8 is a block diagram showing a data writing circuit included in an I/O interface circuit of the microcomputer.

The writing operation of the video information and program data will now be described. FIG. 8 is a block diagram of a data writing circuit in the I/O interface circuit 13 of the micro-computer 3. FIGS. 9A–9I show the waveforms of signals corresponding to various operation modes of the data writing circuit.

A video signal a to be recorded on the video tape 1 is supplied to an input terminal 17 shown in FIG. 8. The video signal a is then fed to a sync tip clamping circuit 18 which clamps the negative limit of the sync signal to a predetermined reference level. As a clamp pulse for the clamping operation, a sync signal SYNC (FIG. 9A) in the input video signal a is used. This sync signal SYNC is obtained by separating it from the video signal a with a sync separator 19. The clamped video signal is fed to a mixer 21 through a change-over switch 20, and is then fed to a video input terminal of the VTR 2 shown in FIG. 2 through an output terminal 22.

Figure 9:
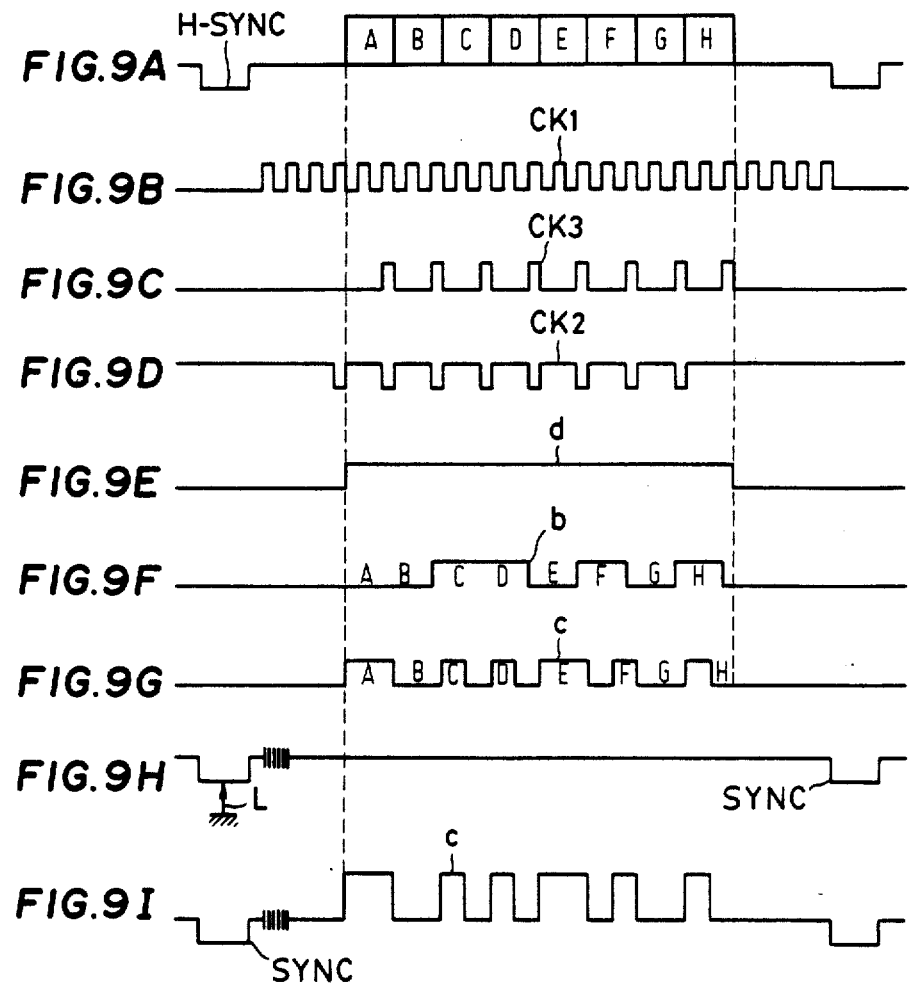
FIGS. 9A-9I show waveforms of signals corresponding to various operation modes of the data writing circuit shown in FIG. 8.

The address data and program data to be recorded are fed from lines $D_0$ to $D_7$ of the data bus 8 of the micro-computer 3 shown in FIG. 2 to a parallel-serial converter 23. After the data is converted into serial data b as shown in FIG. 9F in the parallel-serial converter 23, it is modulated to FM data c shown in FIG. 9G by an FM modulator 24. The FM data c is fed to the mixer 21 through an AND gate 25. After the FM data c is mixed with the sync signal in the mixer 21, it is supplied to the output terminal 22 in the form of a video signal.

The parallel-serial conversion and FM modulation are performed using clock signals CK of 4 MHz frequency which are obtained from the clock line of the micro-computer 3. These clock signals CK are fed to a frequency-division and timing control circuit 27. The frequency-division and timing control circuit 27 feeds to the FM modulator 24 1/10 frequency-divided clock signals CK1 (FIG. 9B) and 1/20 frequency-divided clock signals CK2 (FIG. 9D) which are required for FM modulation. The frequency-division and timing control circuit 27 also supplies 1/20 frequency-divided clock signals CK3 (FIG. 9C) which are required for the parallel-serial conversion to the parallel-serial converter 23.

The frequency-division and timing control circuit 27 also generates a data area signal d as shown in FIG. 9E. This data area signal d represents the interval in which the data within one horizontal scan interval is inserted, and is supplied to the FM modulator 24 so that the FM modulator 24 may be operated for this interval. When the writing operation of data in the VTR is completed, this data area signal d is also supplied to the data bus 8 of the micro-computer 3 through a buffer 28 as a command signal calling for supply of the next data. To the data bus 8 of the micro-computer 3 is also supplied a vertical sync signal V-SYNC output from the sync separator 19 so as to prepare the address data for the recording tracks in the micro-computer 3.

After FM modulation at the FM modulator 24, the address data and the program data to be recorded is supplied to the mixer 21 through the AND gate 25. Since the FM modulator 24 is always in the operative condition during the duration of the data area signal d shown in FIG. 9E, an output corresponding to data "0" is produced even during the non-signal interval. If this output is recorded, it may not be differentiated from the real data "0". In order to prevent this, the AND gate 25 is closed so that the FM modulated data may not be recorded during the non-signal interval. The opening or closing of the AND gate 25 is performed using an output from an RS flip-flop 29. The RS flip-flop 29 is set and reset by signals 80H and 81H (hexadecimal numbers) which are obtained by code conversion by an address decoder 30 of the address data (addresses used in the micro-computer) supplied through lines $A_0$ to $A_7$ of the address bus 7. The address data described above is also the address data which is supplied to the RAM 6 from the CPU 4 when the recording data is supplied to the data bus 8 in the micro-computer 3.

According to the arrangement described above, even if an output is produced by the FM modulator 24 when there is no data, the AND gate 25 is closed and the FM signal having no information will not be recorded. The recording of the track addresses in the recording interval of the video signals is similarly controlled by the opening and closing of the AND gate 25. Therefore, it is not necessary to incorporate a special recording circuit used only for the purpose of recording the track addresses. The signal 80H output from the address decoder 30 is supplied to the shift register inside the parallel-serial converter 23 as a load pulse.

The address data and program data are supplied from the AND gate 25 to the mixer 21 which mixes them with the sync signal and produces a video signal. The video television signal is supplied to the VTR 2. In general, in order to record a digital signal, a new sync signal must be added. However, in the embodiment of the present invention, since the video data and the program data are recorded on the same tape, and in the same manner the recording traces of the sync signals in the video signal recording part and the program data recording part may not be synchronized. In order to prevent this, in the embodiment of the present invention, a sync signal to be added to the data is prepared in synchronism with the sync signal which is contained in the input video signal a which is the same as the video signal to be recorded.

As shown in FIG. 8, the sync signal SYNC in the input video signal a is extracted by the sync separator 19. This sync signal is supplied to the frequency-division and timing control circuit 27 through a horizontal sync separator 31 as a clear signal and it is also supplied to a sync tip clamping circuit 35 through a level and impedance converter 34. To this sync tip clamping circuit 35 is applied a clamping potential which is the same as that supplied to the sync tip clamping circuit 18 at the video input side as described above. Therefore, the negative limit of the output of the sync tip clamping circuit 35 is clamped to the same level L as that of the video signal to be recorded as shown in FIG. 9H. The output from the sync tip clamping circuit 35 is fed to the mixer 21 through the change-over switch 20 to be mixed with the FM data c as shown in FIG. 9I.

According to this recording system, the recording traces of the sync signals in the video signal recording interval and the program data recording interval on the video tape are completely synchronized. Therefore, the VTR 2 performs the recording and reproducing operations in a stable manner.

The switching operation of the change-over switch 20 is controlled by the output of a toggle type flip-flop 36 which receives, as an input, the signal 82H (hexadecimal number) output from the address decoder 30. Thus, during the recording of the video signals, the change-over switch 20 is switched from a contact 20a to a contact 20b during the 12th to 14th line interval and the 275th to 277th line interval, and the sync signal is added to the track address data. On the other hand, when the program data is to be recorded, the change-over switch 20 is switched to the side of a contact 20b about 32 fields ahead of the recording field of the program data, as has been described above.

Since the video signal and sync signal switched by the change-over switch 20 are clamped to the same level by the sync tip clamping circuits 18 and 35, respectively, the level of the recording signal does not fluctuate and the video signal may be recorded in a stable manner during switching of the change-over switch 20. Even if the back porch after the trailing edge of the sync signal deteriorates when the reproducing signal of VTR is used as the video signal to be recorded, the video signal may be clamped in a stable manner.

Figure 10:
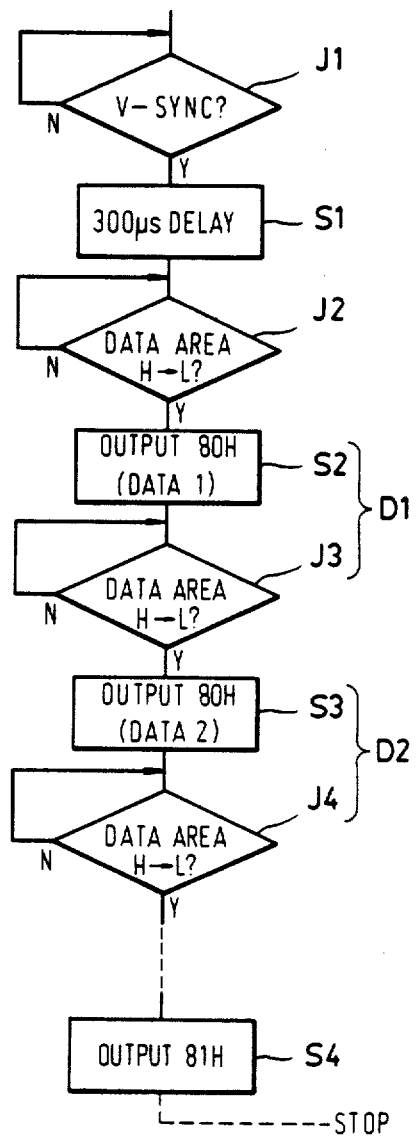
FIG. 10 is a flowchart showing an example of a program for a microcomputer in the data write mode.

In this manner, the video tape 1 as shown in FIG. 1 is prepared. The data recording on the video tape 1 is controlled according to the program for the micro-computer 3. An example of such a program, with particular reference to the opening and closing of the AND gate 25 shown in FIG. 8, is shown in FIG. 10.

First, the micro-computer 3 waits for a vertical sync signal V-SYNC. If the reception of a vertical sync signal V-SYNC is detected in judgment step J1 in FIG. 10, a delay step S1 which delays the signal by 300 μs is performed, and then the flow advances to judgment step J2 for discrimination of high level H or low level L of the data area signal d (FIG. 9E). When the data area signal d is detected as at a low level, a feed instruction of data 1 is supplied to the RAM 6 from the CPU 4 shown in FIG. 2, and the data 1 is fed to the data bus 8 at step S2. At the same time, the signal 80H is output from the address decoder 30, and the data 1 on the data bus 8 is loaded into the parallel-serial converter 23. The signal 80H sets the RS flip-flop 29, and writing of the data 1 is executed, when the data area signal d is at a high level. The write interval D1 of the data 1 continues until it is detected in judgment step J3 that the data area signal is at a low level.

If Y (yes) is obtained in judgment step J3, the next data 2 is written for a write interval D2. During this interval, the feeding and the loading of the data 2, and setting of the RS flip-flop 29 are performed in step S3. When the writing operation of the required data is completed, the signal 81H is output from the address decoder 30 in step S4. Then, the RS flip-flop 29 is reset, and the writing for one field is completed. Subsequently, the writing operation for the next field is executed starting with judgment step J1.

The playback control of the video signals recorded on the video tape 1 shown in FIG. 1 will now be described.

As has been described above, on the video tape 1 there are recorded the programs $P_1, P_2, \ldots$ for controlling the playback of the VTR 2. When the playback by the VTR is initiated, the first program $P_1$ is first read out and is loaded into the RAM 6 of the micro-computer 3. The program for reading the first program $P_1$ is written into the ROM mounted on the auxiliary board of the I/O interface circuit 13 of the micro-computer 3 shown in FIG. 2. The ROM which stores the program is called an initial loader.

Figure 11:
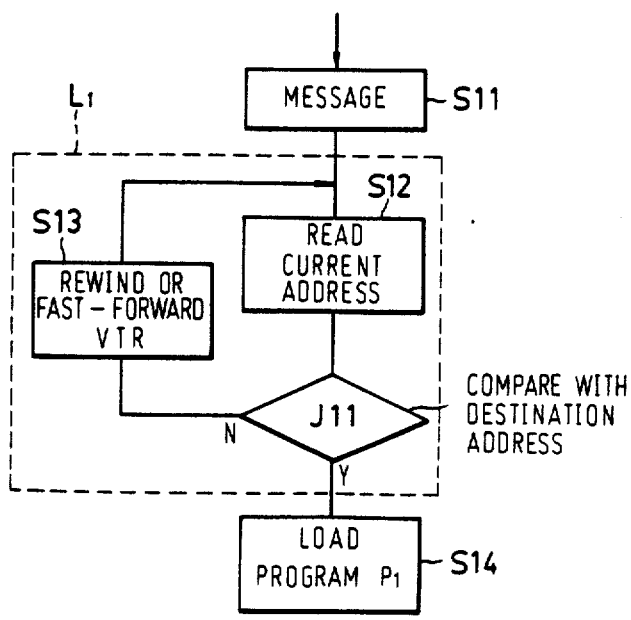
FIG. 11 is a flowchart showing a program of an initial loader.

FIG. 11 is a flowchart showing the program of the initial loader. When the control system is started, the message data is output to the printer 10 shown in FIG. 2 in step S11. Then, the flow enters a cuing routine $L_1$ wherein the readout of the current address of the playback track is performed in step S12. The readout address is compared with the destination address storing the first program at judgment step J11. The address of the first program is preferably the same for every video tape.

If an answer of non-coincidence is obtained as a result of judgment step J11, the tape of the VTR is rewound or fast forwarded in step S13, and the curing routine $L_1$ is continued. On the other hand, if the result of judgment step J11 is Y (yes), the curing routine is terminated. Then, the first program $P_1$ is read out in step S14 and is written into the RAM 6.

Figure 12:
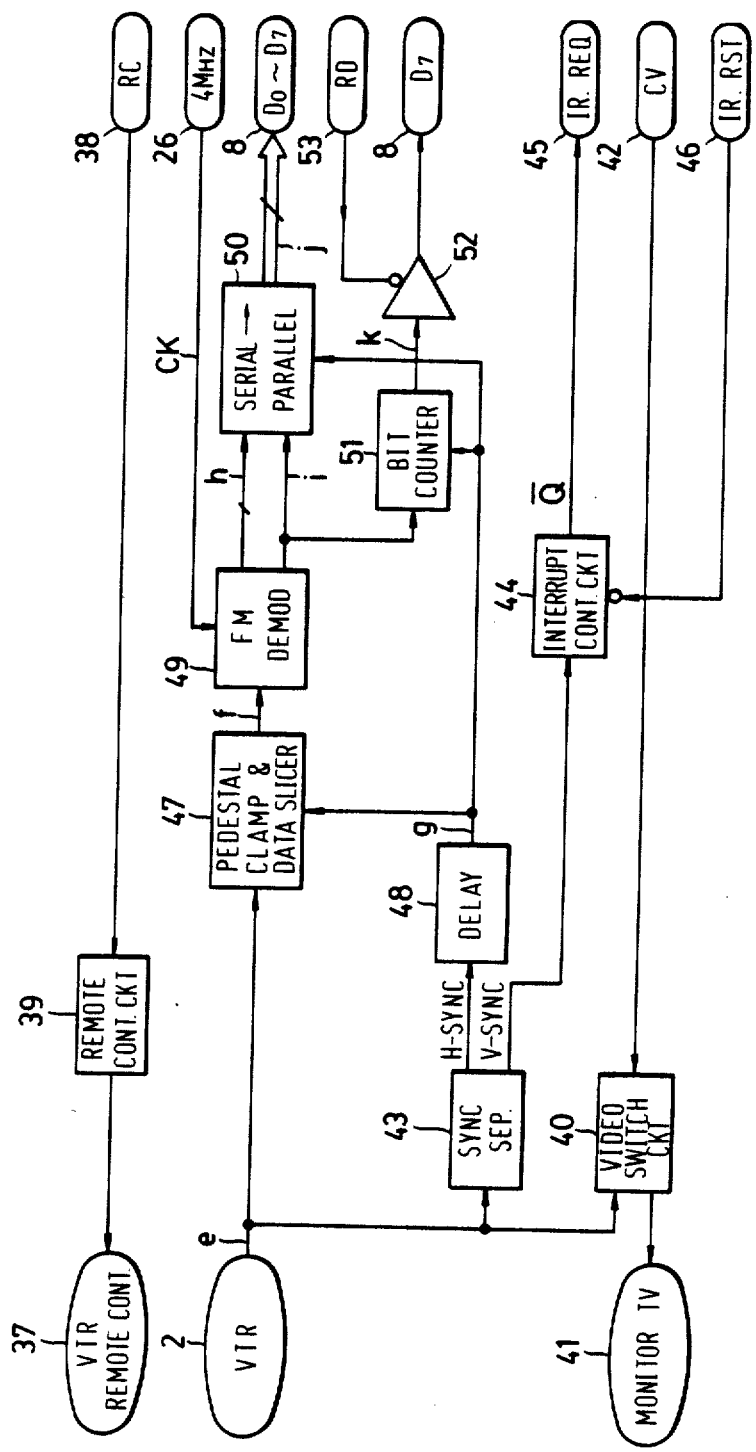
FIG. 12 is a block diagram of a data reading circuit included in the I/O interface of the micro-computer.

FIG. 12 is a block diagram of a data reading circuit included in the I/O interface circuit of the micro-computer 3. FIG. 13 is a timing chart for explanation of the interrupt operation of the program for reading of data in FIG. 12, while FIG. 14 is a flowchart of this interrupt operation.

As shown in FIG. 12, the VTR 2 to be controlled has a remote control terminal 37. A remote control signal RC from a remote control output line 38 of the micro-computer 3 is fed to the remote control terminal 37 through a remote control circuit 39, so that remote control such as fast forward, rewind, playback, high-speed playback (picture search), and so on can be performed.

The playback video output e of the VTR 2 is supplied to a monitor TV receiver 41 through a video switching circuit 40. A video signal CV generated by the microcomputer is supplied to the video switching circuit 40 through a terminal 42. The video switching circuit 40 is controlled so that the display of a message, a question or the like is performed on the basis of the video signal CV if no playback video output e is available from the VTR 2.

In order to read out the data (address data and program data) from the playback video output e of the VTR 2 and to store the necessary data, an interrupt request for enabling data reading is supplied to the micro-computer 3. Upon reception of this interrupt request, the flow operation of the micro-computer 3 branches from the main program to the program routine for data reading. The interrupt request is supplied to the micro-computer 3 upon reception of each vertical sync signal V-SYNC in the playback video output e. First, the playback video signal output from the VTR 2 is supplied to a sync separator 43. The sync separator 43 separates the vertical sync signal V-SYNC (FIG. 13A) which is supplied to an interrupt control circuit 44. The interrupt control circuit 44 comprises, for example, an RS flip-flop. When the vertical sync signal V-SYNC is supplied to the set input of the RS flip-flop, an interrupt request signal IR.REQ of low level (FIG. 13B) is obtained at the Q̄ output. This interrupt request signal IR.REQ is supplied to a terminal 45 to interrupt the main program of micro-computer 3.

As shown in the flowchart of FIG. 14, when the vertical sync signal V-SYNC is detected in judgment step J21, the interrupt request set is performed in step S21. Then, the micro-computer 3 executes the program of the interrupt routine and reads out the necessary data in step S22. The interrupt is released by the program of the interrupt routine. Thus, when the load of the necessary data is completed, the interrupt request reset is performed in step S23 and the interrupt is thus released. In order to release the interrupt request, an interrupt request reset signal IR.RST is fed to the interrupt control circuit 44 from a terminal 46 of the micro-computer 3. Upon reception of this interrupt request reset signal, IR.RST, the flip-flop constituting the interrupt control circuit is reset, and the interrupt request signal is restored to high level as shown in FIG. 13B. When the interrupt request signal goes to high level, the interrupt prohibition state is released. Then, another interrupt may be made, and the program then advances to the main program ("return" by an instruction D21 in FIG. 14).

In the normal video playback interval, after the address data ADR immediately after the vertical sync signal V-SYNC is read out during an interrupt routine IR(a), the program returns to the main program M, as shown in FIGS. 13A and 13B. If a false vertical sync signal N is included due to noise in the playback signal as indicated by the dotted lines in FIG. 13A, an interrupt request is also made by signal N and the flow enters an interrupt routine IR(b). However, when the address data of the next interval is read out, the control returns to the main program M, so that the reading of the address data will not be distributed.

According to the embodiment of the present invention, the interrupt request is released when the interrupt routine is completed without using an interrupt acknowledge signal, so that the generation of the false sync signal does not present the problem described above.

During the program recording interval on the video tape, after the interrupt request is made by the vertical sync signal, the flow enters an interrupt routine IR(c) shown in FIG. 13B. When the reading of the program data according to the interrupt program is completed, the flow returns to the main program M.

Figure 16:
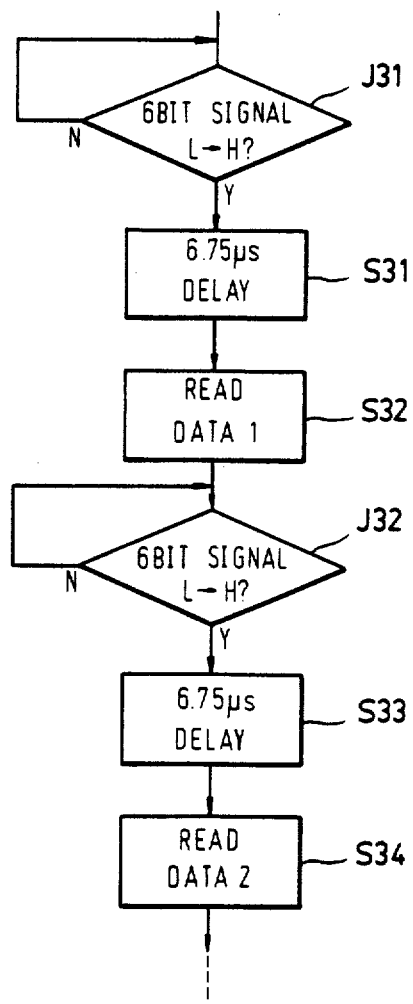
FIG. 16 is a flowchart for explanation of the data readout operation.

FIGS. 15A-15G are timing charts for explanation of the reading operation of the data by the data reading circuit shown in FIG. 12, and FIG. 16 is a flowchart for explanation of the operation of the same circuit.

During data reading, the playback video output e (FIG. 15A) of the VTR 2 is supplied to a pedestal clamp & data slicer 47 to be clamped and sliced at a level U shown in FIG. 15A, so that FM data f (address data or program data) shown in FIG. 15D is extracted. The pedestal clamping is performed using a clamp pulse g which is obtained by delaying the horizontal sync signal H-SYNC (FIG. 15B) from the sync separator 43 to the back porch of the video signal as shown in FIG. 15C with a delay circuit 48.

The FM data f output from the pedestal clamp and data slicer 47 is fed to an FM demodulator 49 and is thereby demodulated to demodulation data h ("1" being high level and "0" being low level) shown in FIG. 15E. The FM data f is a transmission signal which has a self-clock function as described above. Based on the FM data f and the clock pulse CK of 4 MHz frequency obtained from the clock line of the micro-compuer 3, the FM demodulator 49 reproduces an 8-bit shift clock i as shown in FIG. 15F. The demodulation data h and the shift clock i are supplied to a serial-parallel converter 50. At the serial-parallel converter 50, the demodulation data h is sequentially shifted in the 8-bit shift register at each leading edge of the shift clock i and is converted into parallel data. The 8-bit parallel data j output from the serial-parallel converter 50 is supplied to the respective lines of the data bus 8 of the micro-computer 3.

A video player for recording and reproducing digital data such as a VTR generally uses a system in which a shift clock for serial-parallel conversion is generated based on the reproduced horizontal sync signal. However, in the system of the embodiment of the present invention, the recording data is generated in synchronsim with the clock pulse CK of the micro-computer, and the sync signal to be mixed with the recording data is generated in synchronism with the input video signal which is supplied externally. Therefore, the recording data and the sync signal are asynchronous; the interval between the sync signal and the recording data fluctuates within a range of 8 $\mu$sec $\pm 0.25$ as seen from the waveform of the recording signal shown in FIG. 4. For this reason, if the system of performing the serial-parallel conversion of data by generation of the shift clock in synchronism with the reproduced sync signal is applied to the embodiment of the present invention, the reading error for the data increases. Moreover, since the reproduced horizontal sync frequency fluctuates in the case of readout during the high speed playback mode, readout of data becomes difficult. In consideration of this, according to the system of the embodiment of the present invention, the shift clock is generated based on the self-clock in the playback data as has been described above. Therefore, the problem of reading error does not occur, and data may be read out independently of the horizontal sync frequency even during the high speed playback mode.

As a modulation recording system of the self-clock type, transmission systems other than FM modulation may be adopted such as PE (phase encoding), MFM (modified FM), M²FM and so on.

The data supplied to the data bus 8 from the serial-parallel converter 50 shown in FIG. 12 is loaded into the RAM 6 of the micro-computer 3. The timing of the data load is synchronous with the output from a bit counter 51 which counts the 8-bit shift clock i shown in FIG. 15F. In conventional systems, in order to load the parallel data into the RAM every time the serial-parallel conversion is completed, that is, every time the 8-bit serial data is fed to the serial-parallel converter, the bit counter 51 may have the function to generate a timing signal every time it counts 8 bits of the shift clock. However, in the control circuit of the embodiment of the present invention, data transmission of the self-clock type is adopted. Accordingly, if there is a drop out of several bits of data, the data of 8 bits may not be obtained in one horizontal scan interval, and the data load may not be completed.

In order to prevent this, according to the embodiment of the present invention, the 8-bit bit counter 51 is used. From the output from the bit counter 51 is obtained a 6-bit signal k which rises at the 6th bit and falls at the 8th bit as shown in FIG. 15G. This 6-bit signal k is supplied to the data bus 8 through a tristate buffer 52. In response to a reading instruction signal RD output to a terminal 53 of the micro-computer 3, the buffer 52 is rendered conductive; but it is normally nonconductive.

In the micro-computer 3, readout of data is performed using the 6-bit signal k as a flag. As shown in the flowchart in FIG. 16, in judgment step j31, the 6-bit signal k is detected when it goes from low level L to high level H. After a delay of about 6.75 μs in step S31, the data for one horizontal scan interval is read in step S32. The delay of 6.75 μs is made in expectation of the 8th bit of data. According to this reading method, even if the bit drop-out of 2 bits is included in one horizontal-scan interval, the "reading flag" is generated with reception of 6-bit data and readout of data is performed. Although the readout data is error data, correct data may be read out from the next or the track following the next track since the same details written in three adjacent tracks.

When the readout of data of one horizontal scan interval is completed, the bit counter 51 and the serial-parallel converter 50 are cleared by the clamp pulse g (FIG. 15C) output from the delay circuit 48. A data reading interval R as shown in FIG. 15G is taken by delaying the clearing operation with the clamp pulse g. When the complete 8-bit data is read out, the data is loaded in the RAM at the position of an arrow Min in the data reading interval R.

The load-in position of data varies from the arrows Min to Max in accordance with time variations in every executions of the software of the micro-computer for detecting the "reading flag".

When the readout of data of one horizontal scan interval is completed, the data of the next horizontal scan interval is read out according to judgment step J32 and steps S33 and S34 and other steps of the flowchart of FIG. 16. The timing at which the data reading flag is generated may be the 5th or 7th bit of the reproduced data.

Figure 17:
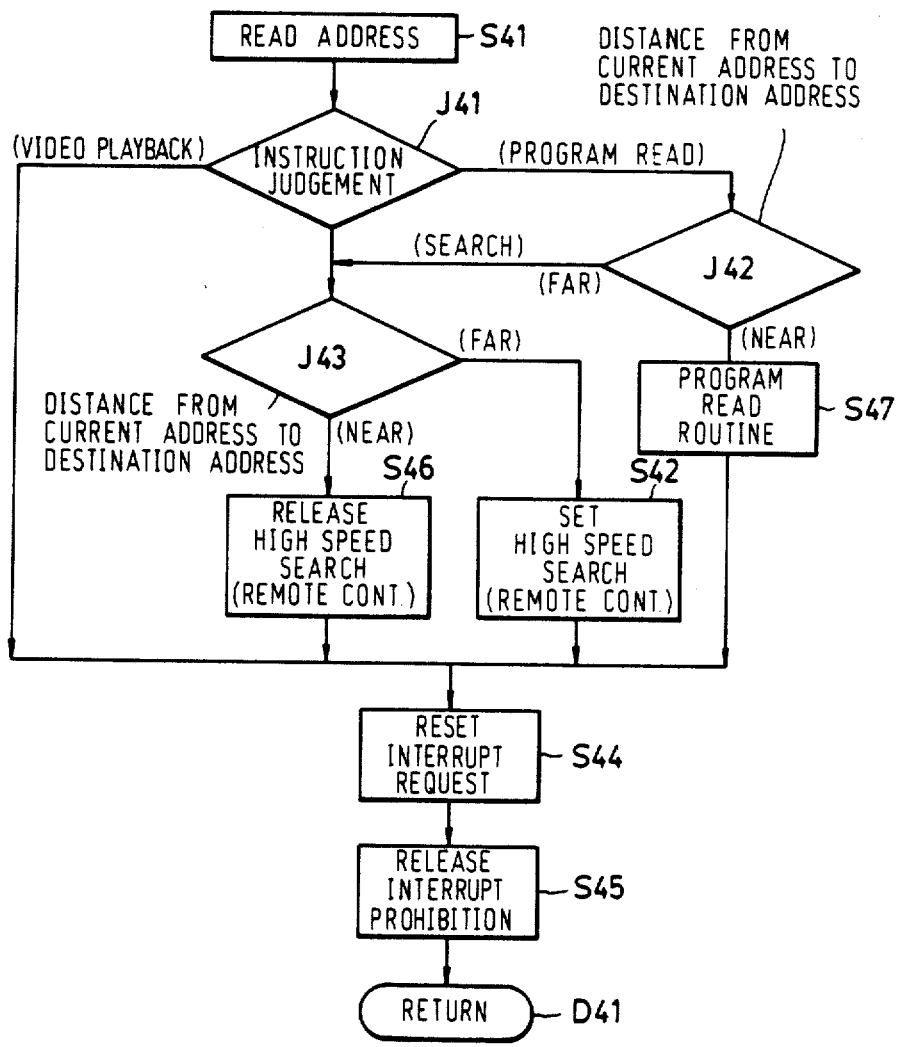
FIG. 17 is a flowchart of the interrupt routine.
Figure 18:
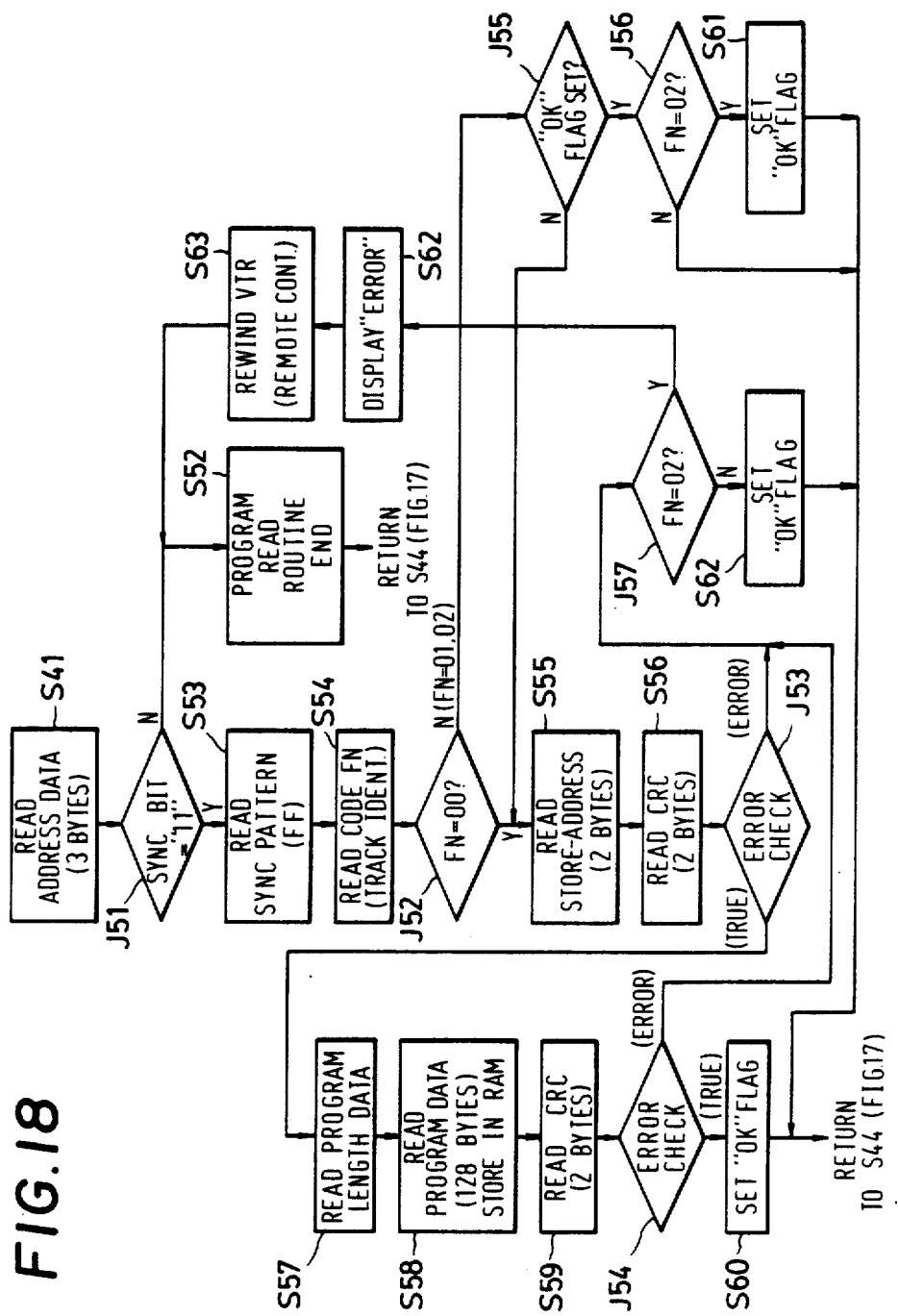
FIG. 18 is a flowchart of the program read routine shown in FIG. 17.

The steps of the interrupt routine (step S22 of FIG. 14) including the data reading operation as described above will be described in detail with reference to FIGS. 17 and 18. FIG. 17 is a flowchart of the overall interrupt routine, while FIG. 18 is a flowchart of the program read routine in the interrupt routine.

When the video tape 1 is placed in the VTR 2 and the mode is set in the playback mode, the interrupt routine is entered every time the vertical sync signal V-SYNC is received as has been described with reference to FIG. 14. In this interrupt routine, as shown in FIG. 17, the track address is first read out in step S41, and the next step is performed according to an instruction from the micro-computer 3 in judgment step J41. First, since a read instruction of the first program is generated, the distance from the current address to the destination address is detected in judgment step J42. The destination address storing the first program $P_1$ is stored in the initial loader in the I/O interface circuit 13.

If the distance is great, the micro-computer 3 generates a search instruction. Then, while measuring the distance to the destination address in judgment step J43, the high speed playback for address search is performed by remote control in step S42. When the high speed search is set, the inerrupt request is reset in step S44. After the interrupt prohibition is released in step S45, a return instruction D41 to the main program M is executed. Every time the interrupt routine is entered upon reception of the subsequent vertical sync signal V-SYNC, readout of address (S41), measurement of the distance to the destination address (J43), reset of interrupt request (S44), and return (D41) are repeated in the high speed search condition. When the destination address draws near, the high speed search is released in step S46 after judgment step J43. The search instruction is released, and the mode is switched to the normal playback mode for program reading.

In this mode, every time the interrupt routine is entered, the address is read out in step S41. The measurement of the distance to the destination address is performed in judgment step J42 after judgment step J41. When the destination address draws near, the program read routine (step S47) is entered. Thereafter, the reading of the program is performed every time the flow goes to the interrupt routine (each field).

When the readout of the first program $P_1$ is completed, the CPU 4 of the micro-computer 3 jumps to the first program $P_1$ and the playback control is performed according to this program. When the video playback instruction is generated in the process of execution of the program, the readout of the address (S41) is performed every time the flow enters the interrupt routine shown in FIG. 17. The interrupt routine is released after a branch to the video playback from judgment step J41, and the flow returns to the main program M.

In the program read routine S47 shown in FIG. 17, processing as shown in FIG. 18 is performed. First, in step S41, the address data of 3 bytes is read out. The data identification code represented by the initial two bits (sync bits) of the first byte of the readout data is judged in judgment step J51. If the sync bits are not "11" (representing the program write field), the program readout is terminated in step S52. Then, an interrupt request reset (S44), an interrupt prohibition release (S45), and a return (D41) are performed.

On the other hand, if the sync bits are judged to be "11" representing the program write field in judgment step J51, a sync pattern FF is read out in step S53, and a track identification code FN is read out in step S54. The track identification code FM is incorporated so as to identify three tracks recording the same program as has been described above. If the track identification code FM is judged to be "00" in judgment step J52, a store address SA of 2 bytes is read out in step S55, and a CRC code of 2 bytes for this store address SA is read out in step S56. Based on the CRC code read out, the error check of the store address is performed in judgment step J53.

If the store address SA is correct, the program length data is read out in step S57. Then, the program data of 128 bytes is read out and written in the RAM 6 in step S58. The CRC cde of 2 bytes for this program data is then read out in step S59. In judgment step J54, the error check of the program data is performed based on the CRC code as described above. If the check result is correct, an OK flag in the RAM 6 is set in step S60. The flow then returns to step S44. The interrupt routine is thus terminated and the return instruction is generated.

If the program data of 128 bytes written in the initial track "00" of the first program segment $P_1$ in the track diagram shown in FIG. 6 is correctly read out in the first program readout operation described above, the flow branches to N (FN=01, 02) in judgment step J52 of FIG. 18 in the program read routine for the playback field of the second track "01" and the third track "02". Then, a judgment is made as to whether the OK flag is set or reset in judgment step J55. In this case, since the OK flag is set, the identification of the second or third track is made in judgment step J56. If it is identified as the second track, the interrupt routine is terminated, and a return instruction is generated. If it is identified as the third track, the OK flag is reset in step S61 to prepare readout of the next program segment $P_2$ (FIG. 6) written on the subsequent three tracks. After the preparation, interrupt routine is terminated, and a return instruction is generated. In a similar manner, the respective program segments $P_2$, $P_3$, ... are read out, so that one program block $P_n$ is loaded in the RAM 6.

If the reading error of the store address or program data is detected in the error check in judgment step J53 or J54 during readout of the initial track recording the first program segment $P_1$, the flow branches to judgment step J57 wherein the track identification code FN is judged. If the track identification code FN is not "02" (third track), the OK flag is reset in step S62 and the interrupt routine is terminated. Then, during the program readout of the second track "01", the reset state of the OK flag is judged in judgment step J55. Then, the program flows from a branch N of judgment step J55 to step S55 and thereafter readout of program data is performed.

Figure 7:
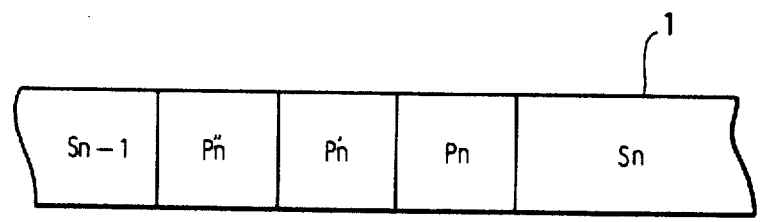
FIG. 7 is a plan view of the video tape for explanation of the multiple write of the program block.

If a program reading error of the second track is detected, the program recorded in the third track is read out. If there is a reading error in the readout of the third track, this means that the readout of this program has failed three times. Thus, an error display is made in step S62 after the track identification in judgment step J57 (FN=02). Subsequently, a rewinding instruction is supplied to the remote control circuit in the VTR 2 in step S63. The program read routine is interrupted in step S52. The second program block $P_n'$ written adjacent to the program block $P_n$ shown in FIG. 7 is searched according to the interrupt routine shown in FIG. 17. At this time, the destination address in the CPU 4 is changed to the address of the program block $P_n'$. If the program readout cannot be performed without error in the second program block $P_n'$, the video tape is rewound to the third program block $P_n''$.

Upon completion of the program readout routine as described above, the first program $P_1$ on the video tape 1 is loaded into the RAM 6. When the readout of the program data is completed, the flow of the CPU 4 jumps to the first program and the playback control is performed according to this program.

Figure 19:
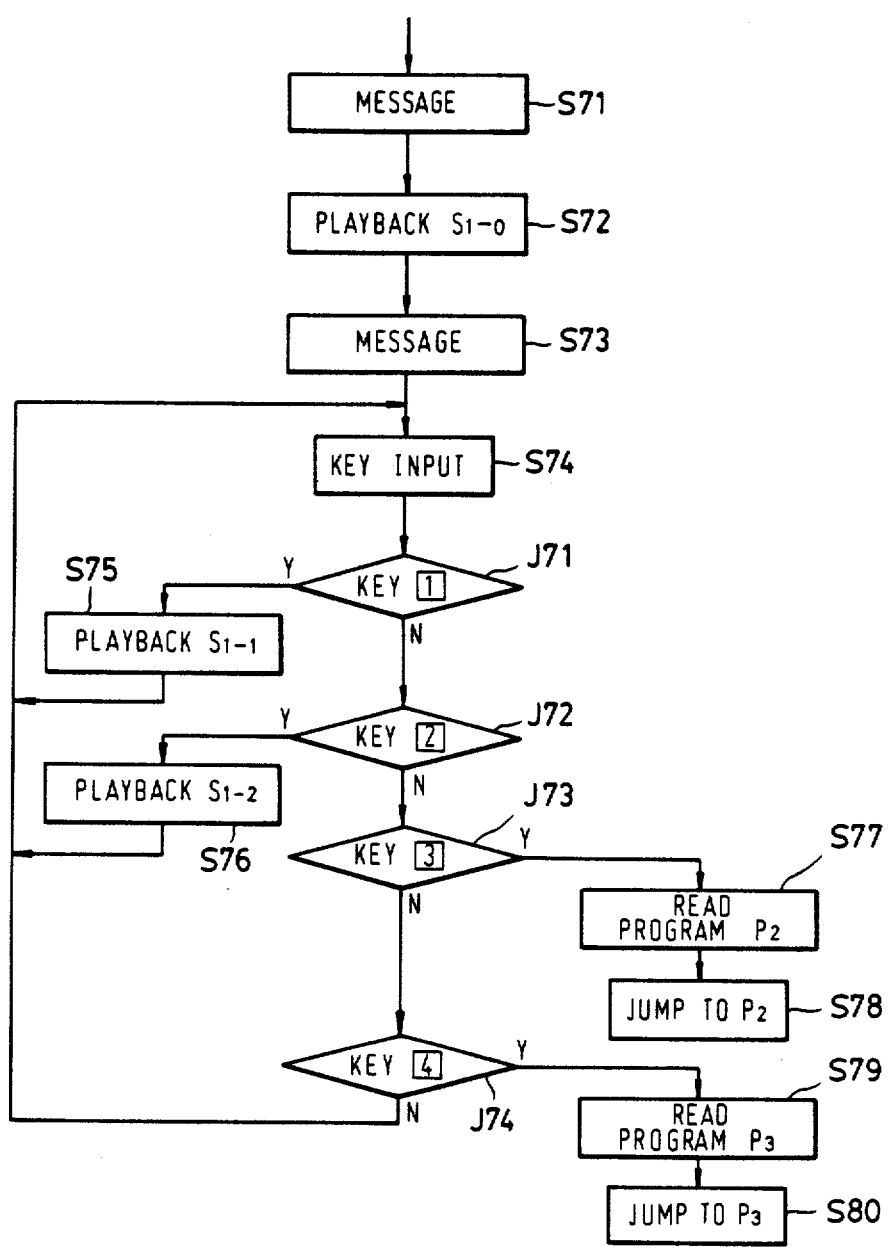
FIG. 19 is a flowchart showing an example of a control program recorded on the video tape.

FIG. 19 is a flowchart showing an example of the first program $P_1$. As shown in FIG. 19, a predetermined message is printed by the printer 10 or displayed by the monitor 41, in step S71. Then, the playback of the video source $S_{1-0}$ on the video tape 1 in FIG. 1 is performed in step S72. When the playback of the video source $S_{1-0}$ of one interval of the first level (educational level) is completed, a message (question) to the student is displayed on the monitor in step S73. Then, the student responds to this question by depressing the key of the keyboard 9 (step S74). The VTR 2 is so controlled that the video source of the next interval is reproduced in judgment step J71 and step S75 if the student depresses key 1. If the student depresses key 2, another video source $S_{1-2}$ is reproduced in judgment step J72 and step S76.

If the student depresses key 3 corresponding to a higher educational level, the VTR is controlled so that the second program $P_2$ is read out in step S77 after judgment step J73. The start address data of the second program $P_2$ is written at part of the first program $P_1$. Based on this start address data, the search of the second program is performed. When the readout of the second program $P_2$ is completed, the flow of the CPU jumps to this program in step S78. The educational program by the video sources $S_{2-0}$, $S_{2-1}$, ... of the second level (educational level) is performed. Similarly, if the student depresses key 4 corresponding to a still higher educational level in the education program of the first level, the third program $P_3$ is read out in step S79 and a jump is made to the third program in step S80 after judgment step J74.

According to the present system, a micro-computer is combined with a video tape recorder. The control program for the video tape recorder is recorded together with the video source. The CPU micro-computer commands the reading of the program on the video tape and the video tape recorder is controlled based on the readout program. The system is very advantageous in that the hardware, need not have an auxiliary memory such as a magnetic disc. A home-type video tape recorder can be used without reconstruction or modification and without providing specific hardware for control.

Further, according to the present system, the number of bits of data of one horizontal scan interval of the program data stored in each track of the video tape is made to equal the number of bits which may be processed by the micro-computer or half this number.

For this reason, the data load process including the data readout, the error check, and the storage of the data during readout of the program data recorded on the video tape by the micro-computer may be executed with software without requiring code converters, data buffers or the like. Accordingly, the I/O interface circuit between the video player and the micro-computer may be extremely simple in construction. In addition, the program data may be loaded in real time, that is, without time delay.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

We claim as our invention:

1. A micro-computer based video player control system for video signals comprising: a micro-computer system including a central processing unit and a memory, and a plurality of I/O ports, a video player connected to one I/O port of said micro-computer system, a video medium receivable in said video player and comprising a recording medium upon which a plurality of video fields are recorded on video tracks, said video fields comprising a video player control program to control the video player, video signals to be displayed, and address data to give addresses for the control program, and said control program is written on more than one video track and is repeated at least once, and during vertical scan intervals, blanking intervals of said video fields are provided, an initial loader program stored in a portion of said memory to control loading and storing said video player control program recorded on said recording medium in a said portion of said memory, and at a discrete address, error correcting codes for each vertical scan interval are recorded in blanking intervals of each video field recorded on said video medium, and a printer to print output data connected to another of said I/O ports, and a keyboard connected to another of said I/O ports to allow a student or instructor to input data.

2. A micro-computer based video player control system according to claim 3, wherein said video player control program is recorded on said recording medium in the form of a video signal, and wherein the data of said video player control program are recorded at a rate of 8 bits for one horizontal scan interval.

3. A micro-computer based video player control system according to claim 1, wherein said initial loader program includes an address read interrupt routine which is triggered by a vertical sync signal reproduced from said recording medium.

4. A micro-computer based video player control system according to claim 1, wherein said video player control program is recorded on said video medium in the form of a video signal, and wherein the same data for said video player control program are recorded on a plurality of successive fields so as to prevent incorrect reading of said video player control program by storing and comparing successive reading from successive fields.

5. A micro-computer base video player control system according to claim 1, wherein a data identification signal is recorded in each video field, said data identification signal indicating whether the signal recorded at each field interval is the actual video signal or is a data signal modified to be a video signal.

6. A control system for a video recording and playback machine comprising: a micro-computer including a first input-output port, a central processing unit, at least one memory, and an address bus and a data bus both connected to said input-output port, said central processing unit, and said at least one memory; said micro-computer connected by said first input-output port to receive inputs from and to supply outputs to said video recording and playback machine, and wherein program data is recorded on a recording medium with video tracks, said medium receivable in said video recording and playback machine, and such program data is recorded on more than one video track and is repeated at least once and is supplied to said micro-computer and is stored in said memory and said micro-computer controlling said video recording and playback machine according to said program data, said micro-computer including a second input-output port connected to said address bus and said data bus and a keyboard for supplying input data connected to said micro-computer through said second input-output port, and said micro-computer including a third input-output port connected to said address bus and said data bus and a printer for producing printed data connected to said micro-computer through said third input-output port, wherein said first input-output port includes a data writing circuit comprising a mixer connected to the input of said video recording and playback machine, a sync separator connected to an output of said video recording and playback machine and supplying a vertical sync output to said data bus and a sync output to said mixer, an address decoder connected to said address bus, a parallel-serial converter receiving inputs from said data bus and from said address decoder, and an FM modulator receiving the output of said parallel-serial converter and supplying an output to said mixer.

7. A control system according to claim 6 including a switch between said mixer and said sync separator to allow data from either of two sources to be supplied to said mixer.

8. A control system for a video recording and playback machine comprising: a micro-computer including a first input-output port, a central processing unit, at least one memory, and an address bus and a data bus both connected to said input-output port, said central processing unit, and said at least one memory; said micro-computer connected by said first input-output port to receive inputs from and to supply outputs to said video recording and playback machine, and wherein program data is recorded on a recording medium with video tracks, said medium receivable in said video recording and playback machine, and such program data is recorded on more than one video track and is repeated at least once and is supplied to said micro-computer and is stored in said memory and said micro-computer controlling said video recording and playback machine according to said program data, said micro-computer including a second input-output port connected to said address bus and said data bus and a keyboard for supplying input data connected to said micro-computer through said second input-output port, and said micro-computer including a third input-output port connected to said address bus and said data bus and a printer for producing printed data connected to said micro-computer through said third input-output port, wherein said first input-output port includes a data reading circuit comprising a pedestal clamp and data slicer connected to an output of said video recording and playback machine, an FM demodulator connected to the output of said pedestal clamp and data slicer, and a series-parallel converter receiving the output of said FM demodulator and supplying an output of said data bus.

9. A control system according to claim 8 including a sync separator connected to the output of said video recording and playback machine, a delay circuit receiving the output of said sync separator and supplying outputs to said series-parallel converter and to said pedestal clamp and data slicer, and a bit counter receiving an input from said delay circuit and supplying an input to said series-parallel converter.

* * * * *